G. G. F. BOSWELL.
SHOCK ABSORBER.
APPLICATION FILED JULY 21, 1919.
1,353,513.
Patented Sept. 21, 1920.
2 SHEETS—SHEET 1.
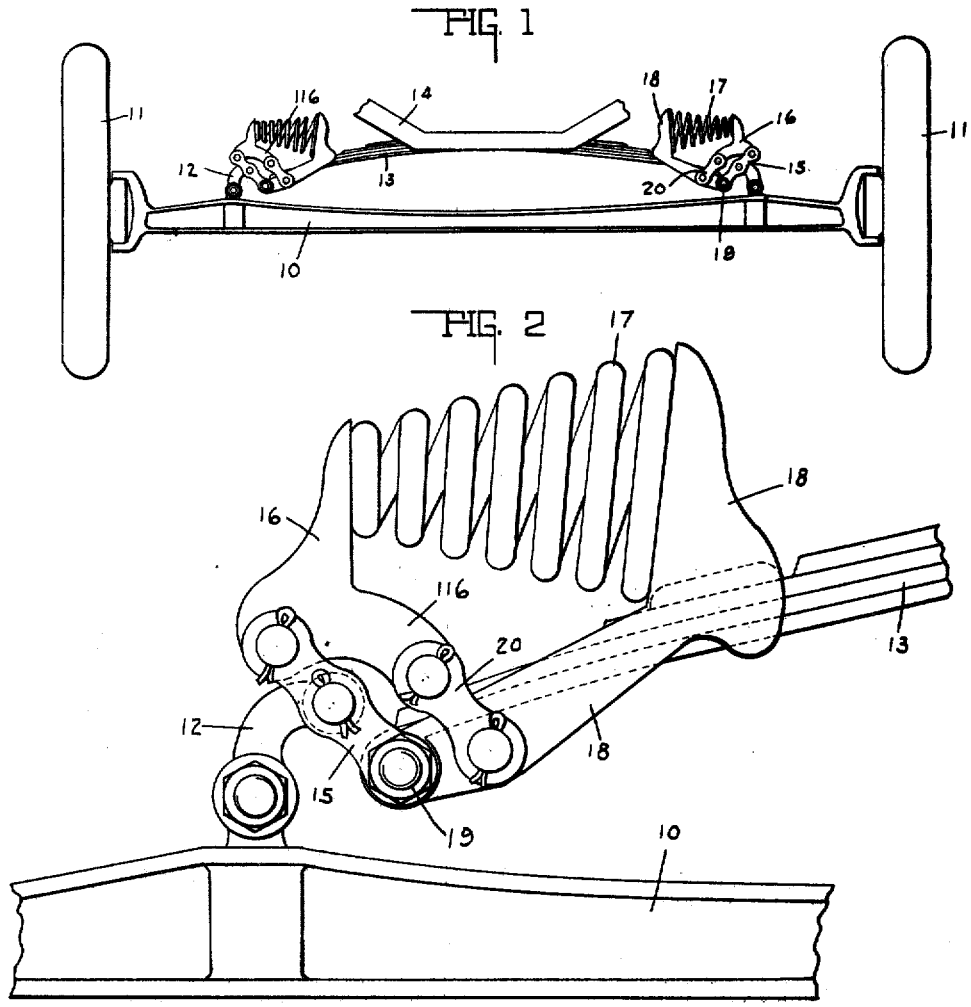
INVENTOR.
GEORGE G. F. BOSWELL
BY
*Lockwood & Lockwood*
ATTORNEYS.

G. G. F. BOSWELL.
SHOCK ABSORBER.
APPLICATION FILED JULY 24, 1919.
1,353,513.
Patented Sept. 21, 1920.
2 SHEETS—SHEET 2.
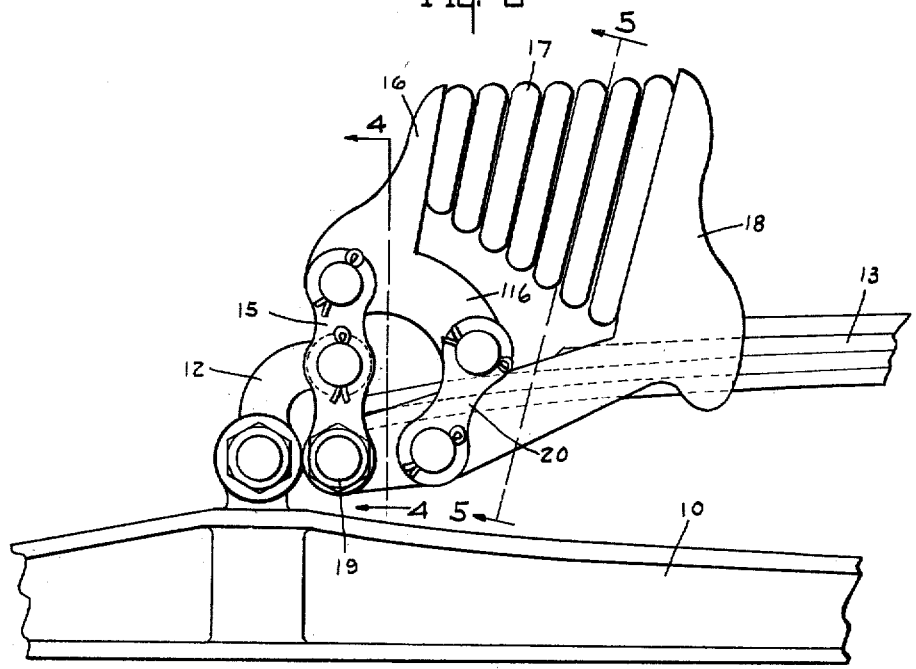
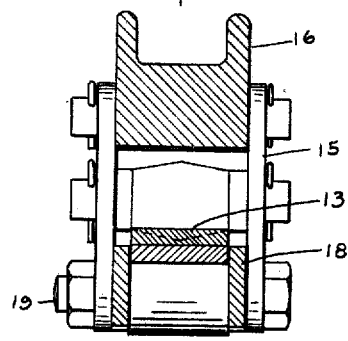
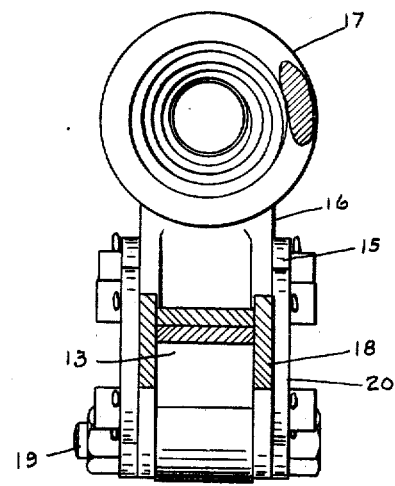
INVENTOR.
GEORGE G. F. BOSWELL
BY
Lockwood Lockwood
ATTORNEYS.

UNITED STATES PATENT OFFICE.

GEORGE G. F. BOSWELL, OF INDIANAPOLIS, INDIANA.

SHOCK-ABSORBER.

1,353,513.  Specification of Letters Patent.  Patented Sept. 21, 1920.

Application filed July 21, 1919. Serial No. 312,283.

*To all whom it may concern:*

Be it known that I, GEORGE G. F. BOSWELL, a citizen of the United States, and a resident of Indianapolis, county of Marion, and State of Indiana, have invented a certain new and useful Shock-Absorber; and I do hereby declare that the following is a full, clear, and exact description thereof, reference being had to the accompanying drawings, in which like numerals refer to like parts.

The object of this invention is to provide a shock absorber adapted for use particularly on Ford automobiles with inturned perches, but said shock absorber can be used successfully on other types of automobiles.

The chief feature of the invention consists in providing shackles for supporting the end of the main spring which are fulcrumed to the upper end of the perch between their ends and to the upper ends of the shackles, a shock absorber lever, said lever having an arm extending inward and downward from intermediate its ends which is connected with shackles that are in turn pivoted to the auxiliary spring support mounted on the main spring; an auxiliary spring being located between said lever and spring support.

The effect and advantage of this construction of shock absorber is that the auxiliary spring is mounted between the faces of two members which are always substantially parallel, which prevents the spring from buckling and bouncing out. Also the end of the main spring on rebound will clear the inner end of the perch.

The full nature of this invention will be understood from the accompanying drawings and the following description and claims.

In the drawings Figure 1 is a front elevation of a part of a Ford automobile equipped with said shock absorbers. Fig. 2 shows a portion of Fig. 1 on a larger scale with the parts in position when the automobile is unloaded. Fig. 3 is the same showing the parts in position when the automobile is loaded. Fig. 4 is a section on the line 4—4 of Fig. 3. Fig. 5 is a section on the line 5—5 of Fig. 3.

In the drawings there is shown the axle 10, wheels 11, perch 12, main spring 13, and part of automobile frame 14, at the front part of a Ford automobile. As the Ford automobile is now built the perches 12 turn inwardly and are integral with the axle, and the ends of the main spring are supported from the upper ends of the perches by pivoted shackles. These shackles are removed when the shock absorber herein is mounted in place.

The shackles of the Ford automobile as built, are removed, and in their places shackles 15 are mounted which are like the former shackles excepting that they are about twice as long and are pivoted to the perches about midway of their ends.

To the upper ends of the shackles 15 a shock absorber lever 16 is pivoted. This lever is of peculiar form substantially of bell crank shape having one arm or extension thereof almost vertical against which the lower end of a conical auxiliary spring or shock absorber spring 17 is located. The other and larger end of the conical spring 17 is seated against a substantially vertical face of a member 18, the upper portion which rests upon the main spring and the lower portion is bifurcated and extends on each side of the main spring to the pivot 19 connecting the shackles 15 with the end of the main spring. Said pivot 19 pivots together the end of the main spring, the lower end of the shackles 15 and the outer end of the member 18. Therefore, the member 18 is in substantially fixed relation with the main spring and moves up and down only as permitted by the main spring.

The lever 16 of the shock absorber has an inwardly and downwardly extending arm 116 which may be said to extend from the main body of the lever intermediate at its ends. Shackles 20 are pivoted to the end of said arm and to the sides of said member 18.

The parts are so formed that in unloaded condition, the shackles 15 and 20 are substantially parallel and the lower pivots and upper pivots substantially equal distance from each other respectively. Also the seats of the auxiliary spring 17 on the two members 16 and 18 are substantially vertical and parallel with each other.

When the load comes on the main spring, its end moves downwardly and outwardly which forces the shackles 15 from the position shown in Figs. 1 and 2 toward the position shown in Fig. 3, the position shown in Fig. 3 illustrating substantially the limit of movement of the parts under extreme load. The lever 16 is moved toward the position shown in Fig. 3 and being controlled in such movement by the shackles 20, the face thereof furnishing seat for the auxiliary spring 17 is maintained substantially parallel with the seat for said spring on the member 18, as seen in Fig. 3. The seat of said spring on the member 18, as the main spring lowers and moves outwardly under load, greatly changes away from the vertical position as the load increases and a substantial corresponding change takes place with the lever 16. The fact is that the construction will operate very satisfactorily as the shock absorber and the conical spring 16 will always be seated on substantially parallel seats in various positions of members of the shock absorber and thus avoid buckling said spring or throwing it out of its place. Also said shock absorber enables the form and position of the perches 12 to be retained without change and yet give ample room for movement of the inner end of the main spring under load, and the end of the main spring will clear the inner end of the perch on rebound. Since member 18 is rigidly secured to the main spring, it is immaterial whether the shackles 15 and 20 be pivoted to the main spring or to said member, as in effect they are pivoted to the spring and move with it.

The invention claimed is:

1. A shock absorber including a main spring, an auxiliary spring, means in fixed relation to the main spring for furnishing a seat for one end of the auxiliary spring, a lever having a seat for the other end of the auxiliary spring, means for furnishing a movable fulcrum for the lever, and means controlled by the movement of the main spring for simultaneously changing the position of the fulcrum and moving said lever on its fulcrum in order to maintain the seats for the auxiliary spring parallel with each other.

2. A shock absorber for automobiles including a main spring, a spiral auxiliary spring, a seat for the auxiliary spring in fixed relation with the main spring, a lever having a seat for the other end of the auxiliary spring, movable means for fulcruming said lever that is controlled by the main spring, and means pivotally connected with said lever away from its fulcrum and which is movable with the main spring.

3. A shock absorber for automobiles including a spiral auxiliary spring, a member adapted to be rigidly secured to the main spring of the automobile and having a seat for said auxiliary spring, a lever having a seat for the other end of said auxiliary spring, shackles pivoted at one end to said lever for fulcruming it and adapted to be pivoted between their ends to a fixed part of the automobile and at their other ends to the main spring, and shackles pivoted to said lever for pivotally connecting the same with the main spring.

4. A shock absorber for automobiles including a spiral auxiliary spring, a member adapted to be rigidly secured to the main spring of the automobile and having a seat for said auxiliary spring, a lever having a seat for the other end of said auxiliary spring, shackles pivoted at one end to said lever for fulcruming it and adapted to be pivoted intermediate their ends to a fixed part of the automobile and at their other ends to the end of said member, and shackles pivotally connecting said lever directly to said member.

5. The combination with a main spring and a fixed spring support of an automobile, of a shock absorber consisting of a spiral auxiliary spring, a member secured rigidly on the main spring for furnishing a seat to one end of said auxiliary spring, a lever having a seat for the other end of said auxiliary spring, shackles pivoted between their ends to said spring support and pivotally connected at their upper ends to said lever and at their lower ends to the ends of the main spring, and shackles pivoted at their upper ends to said lever and at their lower ends to said spring away from the end thereof, substantially as set forth.

6. The combination with a main spring and a fixed spring support of an automobile, of a shock absorber consisting of a spiral auxiliary spring, a member secured rigidly on the main spring for furnishing a seat to one end of said auxiliary spring, a substantially bell-crank lever with a seat at one end for the auxiliary spring, shackles fulcrumed between their ends to said spring support and pivoted at their upper ends to said lever between its ends and at their lower ends to the end of the main spring, and shackles pivoted to the lower inner end of said lever and to said main spring away from its end, whereby the seats for the auxiliary spring will be maintained substantially parallel with each other.

7. The combination with the main spring of an automobile of a fixed spring support, of a shock absorber including a spiral auxiliary spring, a member secured to said main spring with one end portion extending upward and forming a substantially vertical seat for one end of the auxiliary spring and the other end extending along the two sides of said main spring, a substantially bell shaped lever with an upper end having a substantially vertical seat for the other end of the auxiliary spring, shackles fulcrumed between their ends to said spring support and at their upper ends fulcrumed to said lever between its ends, a pivot pinned through the other end of said shackles, and the eye at the end of the main spring and the lower ends of said member, and shackles pivoted to the lower inner end of said lever and to said member away from the end of the main spring.

In witness whereof, I have hereunto affixed my signature.

GEORGE G. F. BOSWELL.